(12) United States Patent
Dally et al.

(10) Patent No.: US 12,517,511 B2
(45) Date of Patent: Jan. 6, 2026

(54) COMBINED PREDICTION AND PATH PLANNING FOR AUTONOMOUS OBJECTS USING NEURAL NETWORKS

(71) Applicant: Nvidia Corporation, Santa Clara, CA (US)

(72) Inventors: Bill Dally, Incline Village, NV (US); Stephen Tyree, University City, MO (US); Iuri Frosio, San Jose, CA (US); Alejandro Troccoli, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 16/268,188

(22) Filed: Feb. 5, 2019

(65) Prior Publication Data
US 2020/0249674 A1    Aug. 6, 2020

(51) Int. Cl.
*G05D 1/00*    (2024.01)
*G06N 3/08*    (2023.01)

(52) U.S. Cl.
CPC ......... *G05D 1/0088* (2013.01); *G05D 1/0221* (2013.01); *G06N 3/08* (2013.01)

(58) Field of Classification Search
CPC .. G05D 1/0088; G05D 10/027; G05D 1/0221; G05D 2201/0213; G06N 5/04; G06N 5/003; G06N 3/08; G06N 20/00; G06N 20/10; G06N 20/20; B60W 30/095; B60W 60/0027; B60W 50/0097;
(Continued)

(56) References Cited

U.S. PATENT DOCUMENTS 8,000,897 B2    8/2011    Breed et al.
9,495,874 B1    11/2016    Zhu et al.
(Continued)

FOREIGN PATENT DOCUMENTS

CN    107169402 A    9/2017
CN    107229973 A    10/2017
(Continued)

OTHER PUBLICATIONS

International Search Report and Written Opinion issued in PCT Application No. PCT/US20/15261, dated May 14, 2020.
(Continued)

*Primary Examiner* — Frederick M Brushaber
(74) *Attorney, Agent, or Firm* — Davis Wright Tremaine LLP

(57) ABSTRACT

Sensors measure information about actors or other objects near an object. Sensor data is used to determine a sequence of possible actions for the maneuverable object to achieve a determined goal. For each possible action to be considered, one or more probable reactions of the nearby actors or objects are determined. This can take the form of a decision tree in some embodiments, with alternative levels of nodes corresponding to possible actions of the present object and probable reactive actions of one or more other vehicles or actors. Machine learning can be used to determine the probabilities, as well as to project out the options along the paths of the decision tree including the sequences. A value function is used to generate a value for each considered sequence, or path, and a path having a highest value is selected for use in determining how to navigate the object.

11 Claims, 9 Drawing Sheets

(58) Field of Classification Search
CPC .. B60W 2554/4041; B60W 2554/4042; B60W 2554/4044; B60W 2554/4045; B60W 60/00274; G08G 5/00; G08G 5/0008; G08G 5/0013; G08G 5/0047; G08G 5/0069; B64C 39/024; B64C 2201/14; B64C 2201/146; H04W 84/06; H04W 60/04

See application file for complete search history.

(56) References Cited

U.S. PATENT DOCUMENTS

| | | | |
|---|---|---|---|
| 9,557,737 | B1 | 1/2017 | Ferguson |
| 10,133,275 | B1 * | 11/2018 | Kobilarov ............ G05D 1/0272 |
| 10,611,371 | B2 * | 4/2020 | Kusano ............ B60W 60/00274 |
| 10,679,099 | B2 | 6/2020 | Kehl et al. |
| 10,783,780 | B2 | 9/2020 | Grotendorst |
| 10,953,878 | B2 | 3/2021 | Arndt |
| 2015/0243044 | A1 | 8/2015 | Luo et al. |
| 2015/0321699 | A1 | 11/2015 | Rebhan et al. |
| 2018/0011496 | A1 | 1/2018 | Fairfield et al. |
| 2018/0120843 | A1 * | 5/2018 | Berntorp ............ G05D 1/0221 |
| 2018/0150081 | A1 | 5/2018 | Gross et al. |
| 2018/0232585 | A1 | 8/2018 | Kim |
| 2018/0374341 | A1 | 12/2018 | Branson |
| 2019/0012574 | A1 | 1/2019 | Anthony |
| 2019/0033085 | A1 | 1/2019 | Ogale et al. |
| 2019/0047554 | A1 | 2/2019 | Vaughn |
| 2019/0077398 | A1 * | 3/2019 | Kusano ............ B60W 30/0956 |
| 2019/0088135 | A1 * | 3/2019 | Do .................. B60W 50/14 |
| 2019/0101917 | A1 * | 4/2019 | Yao ............ G06N 3/04 |
| 2019/0102668 | A1 * | 4/2019 | Yao ............ G06N 3/045 |
| 2019/0137996 | A1 | 5/2019 | Zhang et al. |
| 2019/0266859 | A1 | 8/2019 | Song et al. |
| 2019/0346844 | A1 * | 11/2019 | Chen ............ G05B 13/0265 |
| 2019/0347515 | A1 | 11/2019 | Kehl et al. |
| 2019/0367020 | A1 * | 12/2019 | Yan ............ G06V 10/764 |
| 2019/0384303 | A1 * | 12/2019 | Muller ............ G06K 9/00791 |
| 2020/0004247 | A1 * | 1/2020 | Jacobsen ............ B60Q 9/008 |
| 2020/0017124 | A1 | 1/2020 | Camhi et al. |
| 2020/0039520 | A1 * | 2/2020 | Misu ............ B60W 40/09 |
| 2020/0039521 | A1 * | 2/2020 | Misu ............ G06N 3/042 |
| 2020/0114924 | A1 * | 4/2020 | Chen ............ B60W 40/09 |
| 2020/0117193 | A1 | 4/2020 | Zhou et al. |
| 2020/0159215 | A1 * | 5/2020 | Ding ............ G05D 1/0214 |
| 2020/0174490 | A1 | 6/2020 | Ogale et al. |
| 2020/0189590 | A1 * | 6/2020 | Luo ............ G06N 3/088 |
| 2020/0192365 | A1 | 6/2020 | Russell et al. |
| 2020/0209860 | A1 * | 7/2020 | Zhang ............ G06V 10/25 |
| 2020/0326719 | A1 * | 10/2020 | Tram ............ G05D 1/0221 |
| 2020/0339116 | A1 * | 10/2020 | Xu ............ B60W 30/18159 |
| 2020/0380274 | A1 | 12/2020 | Shin et al. |
| 2021/0342790 | A1 | 11/2021 | Dagley et al. |
| 2022/0138475 | A1 | 5/2022 | Chowdhury et al. |
| 2022/0198753 | A1 | 6/2022 | Sawhney et al. |

FOREIGN PATENT DOCUMENTS

| | | | | |
|---|---|---|---|---|
| CN | 108292134 | A | 7/2018 | |
| CN | 108475057 | A | 8/2018 | |
| DE | 10 2015 219469 | | 4/2016 | |
| DE | 10 2016 211139 | | 12/2017 | |
| EP | 3219564 | A1 | 9/2017 | |
| WO | 2018162521 | A1 | 9/2018 | |
| WO | WO-2018172849 | A1 * | 9/2018 | ........ B60W 60/0011 |
| WO | 2019023628 | A1 | 1/2019 | |
| WO | 2019089591 | A1 | 5/2019 | |

OTHER PUBLICATIONS

International Preliminary Report on Patentability issued in PCT Application No. PCT/US20/15261, dated Aug. 19, 2021.

Natchiket Deo et al. "How would surround vehicles move? A Unified Framework for Maneuver Classification and Motion Prediction", arxiv .org, Cornell University Li Bra Ry, 201 Olin Li Bra Ry Cornell University Ithaca, NY 14853, Jan. 19, 2018 (Jan. 19, 2018), XP081208159, DOI: 10.1109/TIV.2018.2804159 Chapter VI ; figure 2 the whole document.

Requirement for Restriction/Election issued in U.S. Appl. No. 16/268,188, dated Oct. 2, 2020.

Non-Final Office Action issued in U.S. Appl. No. 16/268,188, dated Mar. 4, 2021.

Office Action for United Kingdom Application No. GB2112514.1, mailed Dec. 16, 2022, 7 pages.

Shalev-Shwartz et al., "On a Formal Model of Safe and Scalable Self-driving Cars," Oct. 27, 2018, 37 pages.

Office Action for United Kingdom Application No. GB2112514.1, mailed Jun. 9, 2022, 3 pages.

United Kingdom Combined Search and Examination Report for Application No. GB2307566.6, mailed Jul. 19, 2023, 6 pages.

Office Action for Chinese Application No. 202080012391.2, mailed Nov. 19, 2024, 18 pages.

Office Action for United Kingdom Application No. GB2112514.1, mailed Apr. 28, 2023, 4 pages.

Office Action for Chinese Application No. 202080012391.2, mailed Dec. 21, 2023, 22 pages.

Office Action for Chinese Application No. 202080012391.2, mailed Jul. 5, 2024, 20 pages.

Notice of Reexamination for Chinese Application No. 202080012391. 2, mailed May 29, 2025, 16 pages.

Notice of Decision to Grant for Chinese Application No. 202080012391. 2, mailed Aug. 26, 2025, 8 pages.

* cited by examiner

COMBINED PREDICTION AND PATH PLANNING FOR AUTONOMOUS OBJECTS USING NEURAL NETWORKS

BACKGROUND

Technological advances have resulted in the introduction of autonomous control technology for many different uses. In the case of self-driving cars, for example, this includes determining a path to be taken by a vehicle based on the state of the surroundings, as may be determined using sensor data captured by the individual cars. While such approaches provide for adequate navigation planning in many circumstances, conventional approaches do not account for the probable reactions of nearby vehicles in response to actions taken by the car being navigated. Thus, the path planning is not as accurate as it could be, and may result in sub-optimal paths when nearby vehicles have certain types of reactions or movements.

BRIEF DESCRIPTION OF THE DRAWINGS

Various embodiments in accordance with the present disclosure will be described with reference to the drawings, in which.

DETAILED DESCRIPTION

Figure 1A:
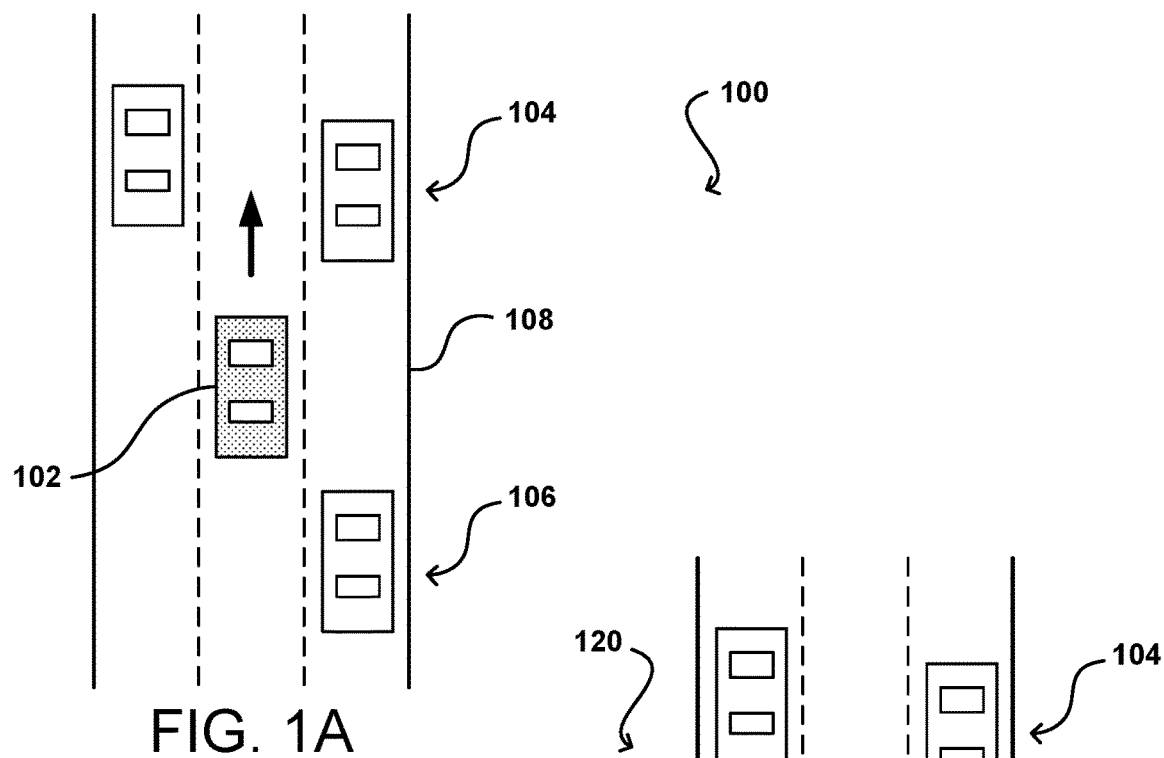
FIGS. 1A, 1B, and 1C illustrate an example sequence of actions that can be predicted and used for path planning in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments provide for the navigation of controllable objects, such as autonomous vehicles or robots. These objects can be at least partially autonomous or controllable, and are capable of maneuvering based in part upon determined paths, actions, or goals, among other possibilities discussed and suggested herein. One or more sensors can be used to sense information about objects (actionable or otherwise) near a present object to be maneuvered. Information can also be obtained from nearby objects if available. The information can be used to determine a sequence of possible actions for the present object to take to achieve a determined goal, such as to progress towards a determined destination. For each possible action of the present object, one or more probable responsive or reactive actions of the nearby objects (i.e., actors) can be determined. This can take the form of a decision tree in some embodiments, with alternating levels of nodes corresponding to possible actions of the present vehicle and probable responsive actions of one or more other vehicles or actors. Machine learning can be used to determine the probabilities, as well as to project out the options along the branches and paths of the decision tree including the sequences. In some embodiments only actions with at least a minimum probability are considered. In another embodiment, actions can be considered based on factors such as the corresponding amount of risk or loss, favorability, occupant comfort, and the like. A value function can be used to generate a value for each considered sequence, or path, and a proposed navigation path having a highest value can be selected. At least a first action of the proposed navigation path can be provided to an optimizer of a control system, which can use the first action to determine how to navigate the present object. The selected path and related data can be used to update one or more machine learning models that were used for the determination, such as by sending the relevant data to a remote server capable of further training the models, which can then be used for future determinations. Transferred learning can thus be used for continued learning in at least some embodiments. Such approaches provide significant advantages over conventional approaches that separate the tasks of prediction and planning, such that the prediction is independent of the planned path, resulting in poor plans in conventional approaches.

Various other functions can be implemented within the various embodiments as well as discussed and suggested elsewhere herein.

As mentioned, various approaches to navigating or maneuvering autonomous (or at least semi-autonomous) vehicle involve some type of path planning for the vehicle. A vehicle can have various sensors as discussed elsewhere herein, as may include cameras, proximity sensors, depth sensors, motion sensors, position sensors, accelerometers, electronic compasses, and the like, which provide data that can be analyzed to determine a state of the world or environment within a determinable distance of the vehicle. For example, in a state 100 such as that illustrated in FIG. 1A, a vehicle 102 might be able to collect and analyze environment data that enables the vehicle to determine its location on the road. The vehicle 102 may then be able to determine, based at least in part upon a determined destination or goal, a set of navigation actions to maneuver the vehicle to that destination along the road. This can include, for example, accelerating or decelerating, changing lanes, making turns, and the like. While such actions can be determined in a maneuver space that can be discretized, for example, it is also possible in some embodiments to predict an optimal or preferred trajectory of the car based on factors such as the current state of the environment, goals, and predicted reactions, then determined maneuvers that function to follow the optimal trajectory. Such an approach may not utilize a tree-based approach, but can function as part of a generalized decision process. In one embodiment, a decision manager may predict a set of discretized actions as well as a set of continuous, optimal values, such as an optimal position in one second, two seconds, and so on. The discretized actions in the maneuver space can be provided to an optimizer in some embodiments, which can then determine the small adjustments to actually be performed by the vehicle on the short time scale, such as over the next 50 ms.

Figure 1B:
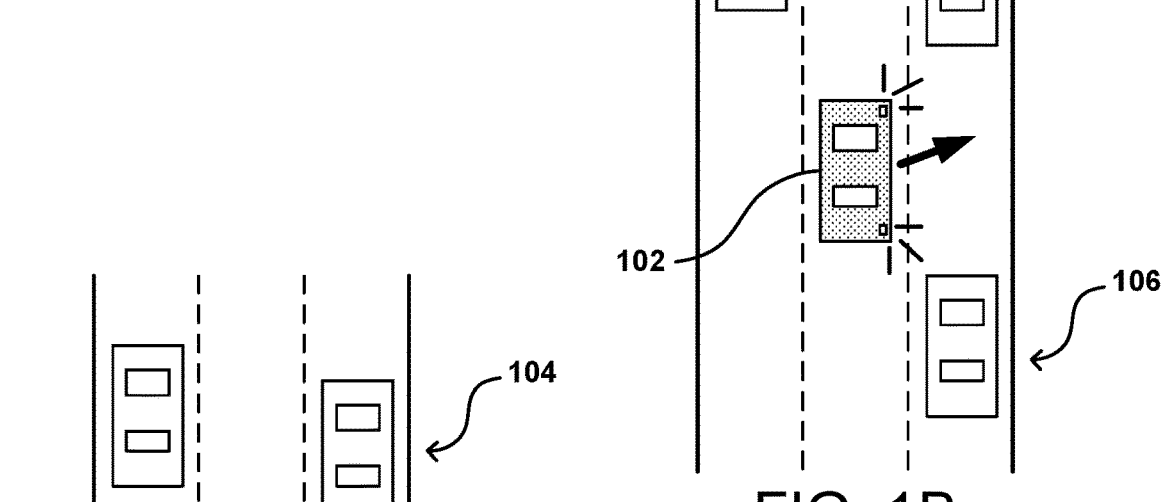

As is often the case, however, the vehicle will have to take into consideration that there are other objects in the environment that the vehicle must take into consideration. This can include, for example, considering other vehicles (e.g., vehicles 104, 106, among others) on the road 108, as well as their relative speeds and directions of travel, etc. In almost all situations it will be a goal of the vehicle to prevent collisions with the other vehicles while accomplishing its goal. There may be various other goals as well, such as to maximize the comfort of the occupant of a vehicle, maximize the view or experience, avoid near-collisions or jarring actions, and the like. Such an approach can include determining a path to the destination that avoids collisions with the other vehicles. Conventional path planning algorithms could analyze the relative positions of nearby vehicles 104, 106 on the road 108, predict the most likely future paths of these nearby vehicles, and determine appropriate actions to take. This can include, as illustrated in the example state 120 of FIG. 1B, the vehicle making a change into the right lane between two vehicles 104, 106 with sufficient space between the vehicles in front and in back of the vehicle after the lane change.

Figure 1C:
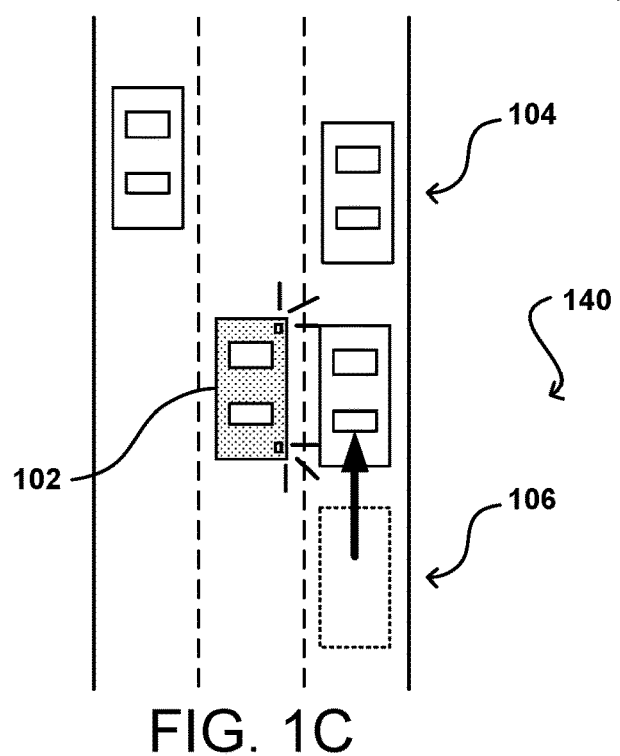

Such path planning, however, does not take into account the possible, or probable, actions of the other vehicles 104, 106 in response to the attempt to move the vehicle 102 into the right lane. For example, a driver of one of the other vehicles 106 might see the turn signal of the vehicle 102 attempting the lane change and accelerate as illustrated in the state 140 of FIG. 1C to block the vehicle 102 from being able to get over in front of the other vehicle 106. There might be other actions taken by the other driver as well, such as to decelerate to make space, or to simply continue at the current speed and direction which may not provide enough space for the vehicle 102 to move into the right lane as planned. The prediction of future position of a vehicle 106 is not independent of the actions of another nearby vehicle 102, but rather is at least partially dependent on these actions. Thus, the planned path for the vehicle 102 may not be successfully executed, and the vehicle may have to determine after a period of time that another path or option needs to be determined. This can result in a delay that may cause the vehicle to miss its exit or at least not progress optimally towards the goal or destination.

Accordingly, approaches in accordance with various embodiments can attempt to include predictions of other actors or objects (e.g., vehicles, pedestrians, cyclists, etc.) in the path planning process. A sequence of possible actions for all actors can be considered and taken into account when attempting to determine the best action for the respective vehicle to take next. This can include, for example, using a tree search to predict different trajectories for the other actors in response to various actions that may be taken by the vehicle to be navigated. Such a process can result in a much more accurate plan that is possible using conventional path planning approaches. Further, in at least some embodiments the other actors can be characterized in a number of ways, such as one of a set of classifications that can be used to more accurately predict their behavior, as an aggressive actor will likely react or move differently than a cautious or inattentive actor. Machine learning can be utilized to improve the characterization of the actors, as well as to improve the predictions used in the creation of the decision tree or determination of values for each sequence of options. In some embodiments the behavior may not be characterized by a discrete set of classifications, but may instead be determined according to a set of determinable behavior parameters. This may include having one or more scalar parameters to determine the degree of aggressiveness of a driver, for example, among other such options.

In some embodiments, the process may involve predicting, or determining the probability of, the presence of vehicles or other actors that are hidden from the view of the sensors, such as by being blocked in the field of view by another vehicle. Thus, the process may consider the likelihood of a car being stopped in a location that is out of sight, such as at or near an intersection or driveway. This can also include the possibility of pedestrians at a crosswalk, bikes along the side of the road, etc. A future prediction may include the appearance of actors that are not present in the current scene. If inter-vehicle communication is available, the process can also accept information for objects that are out of view of the current vehicle, but visible or detectable by other actors or objects nearby.

In various embodiments, a vehicle such as an autonomous vehicle, will make action decisions on multiple time scales. For example, the vehicle may consider a path on an outermost time scale that may involve hours of travel for the entire route to a destination. Actions determined on that time scale may include making specific turns to take specific routes, and may include lane changes needed to properly prepare to make those turns. Another time scale just below that may be a five to ten second time scale, which is on the order of time it takes to stop an average autonomous vehicle (although that time scale may vary as appropriate depending upon factors such as the type of vehicle, maximum velocity, and path conditions, etc.). Since that is the amount of time it would take to stop the vehicle in an emergency situation, the vehicle can make a specific plan over that time frame. The five-to-ten second planner outputs a target position for every "move" of the present vehicle. A typical move may take from 250 ms to several seconds. In many embodiments the vehicle will also make determinations over a third, finer time scale that is used to make specific adjustments to the vehicle to follow a determined path and account for changes in the nearby environment. In some embodiments, a controller or optimizer can take as input the outputs of a five-to-ten second planner, and use this information to determine the actions to take over, for example, the next 50 ms time period. In at least some embodiments these decisions can be made concurrently. This can include, for example, determining adjustments to the steering, acceleration, braking or deceleration, and the like. The optimizer may then make new decisions for each 50 ms time period, using updated information from the vehicle sensors, the most recent five to ten second plan, and other such relevant information.

As mentioned, conventional five to ten second planners make decisions as to actions to take for a vehicle using a prediction of other vehicles' actions that is independent of the present vehicle's actions. The planners may use a simple prediction of the motions of the nearby actors, but this prediction is based upon factors such as the current direction, location, speed, and acceleration of the nearby actors, and does not take into account that some of these value may change based upon actions of the present vehicle, such as if the present vehicle changes lanes or pulls in front of one of those vehicles. For example, a conventional robot path planning algorithm performs an A* tree search of possible moves or actions for the present vehicle independent of changes that may occur to other actors as a result of those moves or actions. Other approaches have been attempted as well that utilize, for example, reinforcement learning for path planning, but such approaches are still taken independent of the predictions of reactions of other nearby or proximate actors.

Approaches in accordance with various embodiments attempt to consider the predicted trajectories of other actors, and utilize those predicted trajectories in determining a path or sequence of actions for a present vehicle to be navigated. Further, the predictions for the trajectories of those other actors can take into account the moves or actions of the present vehicle at various stages, points, or levels of the possible path, such that different possible reactions can be considered. Thus, considerations can be taken into account that if the present vehicle changes lanes, the other cars may change their trajectories based on that, which then need to be accounted for differently. Instead of managing path prediction using conventional approaches such as reinforcement learning or an A* search, approaches in accordance with various embodiments can treat the path planning like a multi-player cooperative game, where the players may have common goals and essentially take turns in achieving those goals, where the action taken by one player at a point in time can depend at least in part upon what the other players have done at a prior point in time. While the ultimate goal for each actor may be different, such as to reach different destinations, there will likely be goals in common, such as to avoid collisions and move as efficiently as possible.

If path planning is viewed as a multi-player game with sequences of actions taken by each actor, where those actions may depend at least in part upon the actions of others, then the set of possible actions at each stage, point, step, or level can be used to generate a decision tree that includes all possible options for each vehicle. The sequences of possible actions over the time period can each correspond to paths of the tree from a root node to a respective leaf node. As discussed herein, a value function can then be utilized to determine a value for each path, or sequence of actions. The path leading to the highest value leaf node may then be selected as the five-to-ten second path for the vehicle. Data for the selected path can then be provided to an optimizer, for example, to determine the next action, or set of actions, to be taken by the vehicle, such as to turn the wheel, accelerate, decelerate, activate a turn signal, etc. The value function may determine value using a number of factors as discussed herein, such as may include penalties for options that would result in collisions, breaking the law, or making rapid acceleration changes that may be unpleasant for a passenger. The function may also include rewards for making progress towards the destination, making a successful lane change, avoiding collisions, providing a smooth ride, and keeping safe distances, among other such options. Various different value functions can be used that consider different value criteria, and there may be different weightings applied to different value criteria depending upon the current situation, as may benefit from machine learning in at least some embodiments.

Figures 2A, 2B:
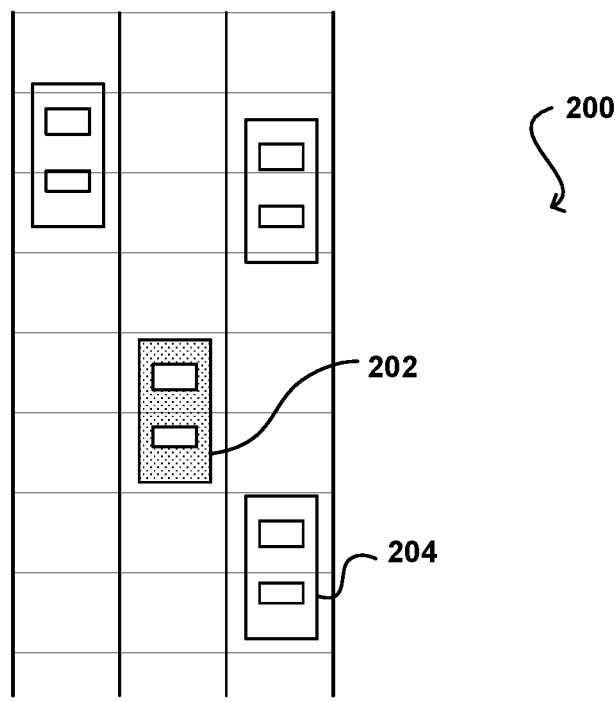
FIGS. 2A and 2B illustrate example planning grids that can be utilized in accordance with various embodiments.

Considering all possible actions of all potentially relevant actors, however, may result in a significant amount of data to be processed, which may require significant resources and may result in longer decision times, which may be undesirable for many situations. Accordingly, approximations can be made or options discarded which will have little, if any, impact on the ultimate decision. For example, the space on a current roadway can be divided into a grid 200 or array of cells, as illustrated in FIG. 2A. The grid can be discretized into a fixed number of positions per lane, for example, and with a cell size that may be a factor of the average vehicle size, such as half an average car length. Such an approach can be used to determine which cells will be occupied by a given actor at a given point in time, which requires much less data than if attempting to track by actual position. Further, the set of options for each actor can be discretized as well. FIG. 2B illustrates an example movement option grid 250 that can be utilized in accordance with various embodiments. It should be understood that other size grids with other options can be used as well within the scope of the various embodiments. In this example, the movement options along a horizontal axis (in the figure) are to turn to the left (L), go straight (S), or turn to the right (R). The movement options along a vertical axis (in the plane of the figure) are to accelerate (A), maintain current speed (M), or decelerate (D). In this way, the possible options for an actor can be simplified to a set of nine possible actions, such as to accelerate and turn right (AR), maintain current direction and speed (MS), etc. At each level of the decision tree, a given node may then have nine branches, each corresponding to one of the potential motion options. As discussed herein, a probability may be determined for each of those options, which can be factors into the value determination for a given branch.

Such an approach may still result in very large decision trees, as well as large amounts of data. Accordingly, in at least some embodiments a subset of these options may be ignored or discarded where those options are unlikely to impact the choice of path or action. While analyzing more actors may result in more accurate predictions and determinations, the decisions will be most impacted by the nearby or proximate vehicles, such as the vehicle directly in front of or behind the present car, as well as the cars in the nearby lanes that might be impacted by any lane change of the present vehicle. Thus, if using the grid approach it might make sense to only look at up to eight other actors, including those in front of, behind, to the side of, and potentially diagonal from the present vehicle in the grid. In addition to the present vehicle potentially only being able to gather a reasonable amount of data about these actors due to their relative proximity, such an approach can greatly decrease the amount of data to be considered and the size of the decision tree. Further, the actions of other actors will more directly impact one or more of the monitored vehicles, which then can be used to adjust the path determination of the present vehicle. In some embodiments, cars such as the car in front may be weighted more heavily in the determination, as its actions may have more impact on the path decisions than a car behind and in a different lane, etc. If the data for a nearby vehicle (or other actor) is available, and its next move can be obtained, then a prediction need not be made and a single node at that level utilized in the tree that corresponds to the next action for that vehicle.

Similarly, in at least some embodiments various path options may be discarded if they have a very low probability value, such as less than a minimum probability threshold. In other situations, however, a low probability situation may be important for planning, as the outcome may be very negative, which can minimize the risk aim. In these embodiments, low probability paths with standard or positive outcomes may be pruned advantageously. In one example, if the car 204 in the right lane is not coming up on an exit ramp or turn option, there is a very low probability that the car 204 will turn to the right at the next point in time along the path.

Thus, all options involving a right turn may be excluded from consideration, eliminating those branches from the decision tree. Further, since the present car 202 is just ahead and to the right of that car 204, and the car 204 has a goal of avoiding collisions, the car 204 may have a very low probability of accelerating and turning to the left at the next point in time. Thus, this path option may be excluded from consideration (at least for path planning purposes) as well.

The probability of a given driver taking any of the path options may also depend, however, upon one or more aspects of the driver. For example, a drunk driver may have a more equal possibility of taking any of the actions. An aggressive driver may be more likely to increase speed, fail to maintain safe distances, or attempt to block any attempts to move in front of that driver. A cautious driver may be more likely to attempt to move away from other vehicles, meaning that they may be more likely to decelerate or change lanes away from vehicles. Various other characteristics or behaviors may be observed as well. Thus, an attempt can be made in at least some embodiments to classify the drivers of nearby cars to improve the probability determinations. This can include, for example, monitoring data captured for those vehicles over a period of time and using that data to attempt to perform an accurate characterization. Machine learning can be used in some situations to attempt to more accurately classify a driver based on the available information, such as rate of speed, distances maintained, frequency of lane changes, variations in direction, and the like. If the vehicles are able to communicate, information provided by other vehicles may help with this classification.

Figure 3:
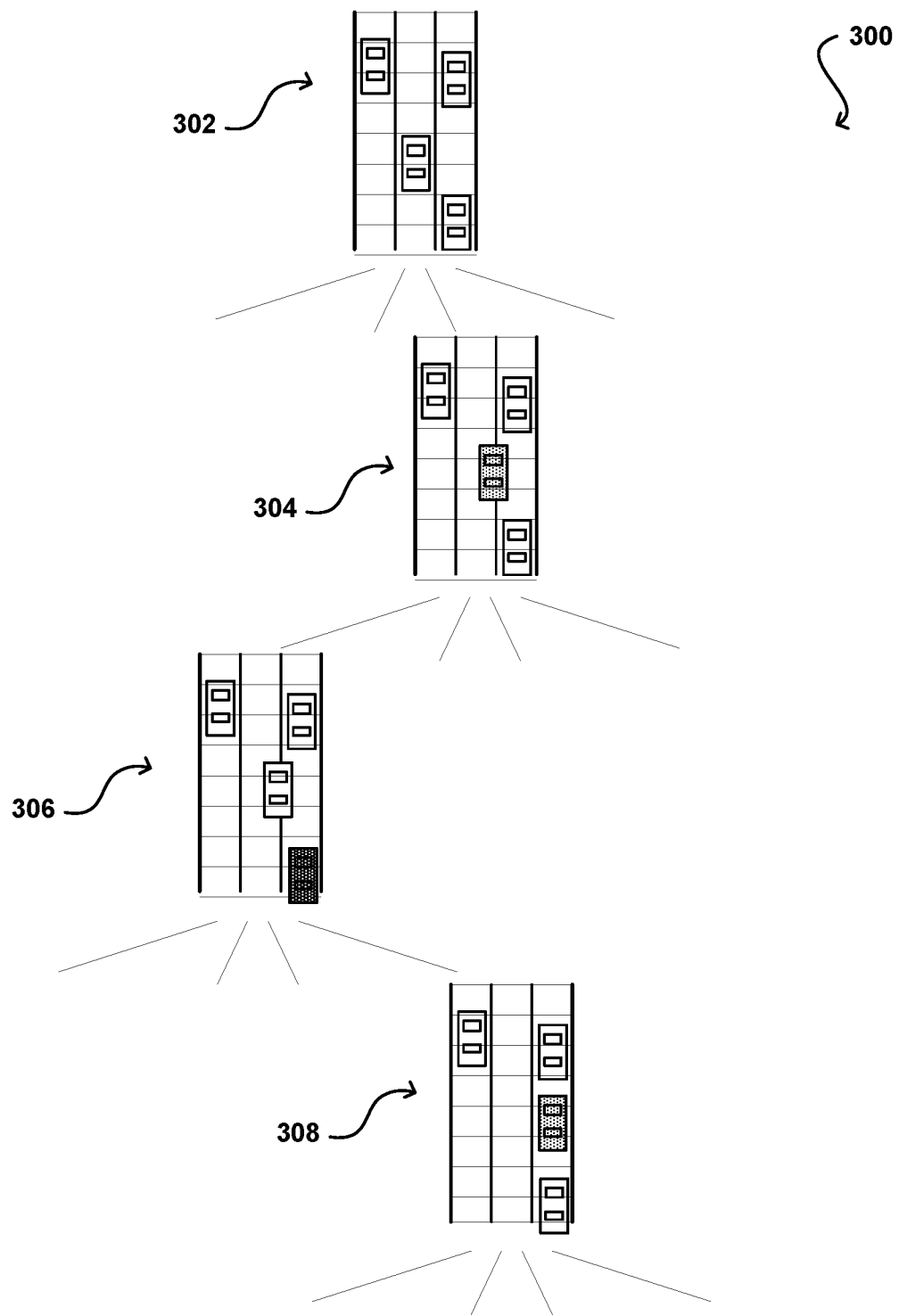
FIG. 3 illustrates an example decision tree that can be utilized to determine a highest value navigation option in accordance with various embodiments.

The result may then be a tree structure 300 such as illustrated in the example of FIG. 3. In this example there are many levels of nodes, with each non-leaf node having a number of branches extending from that node. Each branch corresponds to a path option as discussed herein. In the example, only the nodes of a single path are illustrated. A root node 302 represents the current placement of the vehicles, and may reference other information as well, such as current speed or acceleration, etc. The sequence of actions is considered as a turn-based game, where nodes 304 at a first level each correspond to actions that can be taken by the present vehicle (shaded). This can include, for example, paths for up to the nine possible movement actions (AR, MS, etc.).

A next lower level of nodes 306 will correspond to options that could be taken by one or more other vehicles (shaded) in response to the action taken by the present car in the parent node 304 of the preceding level. Thus, if the present car moves to the right as illustrated in the parent node 304, a given vehicle (shaded) might take various actions in response, which in the illustration is to decelerate slightly to provide more room for the present car to change lanes. Other options could include the other vehicle accelerating to attempt to block the lane change, or another lane change as well, among other such options. Each of these potential options by the other car(s) can then serve as a branch to a respective node 306 at this level. The action for the present vehicle can be determined in response to that possible action by the other vehicle as a branch to a node 308 at the next level. This process can continue with a number of levels corresponding to the time scale in some embodiments, such as out to five or ten seconds with each level corresponding to a 0.25 second increment in one embodiment. The nodes of the last level can then correspond to leaf nodes at the end of the various paths, where the value determinations for the paths can be made. It should be understood that leaf nodes may exist at other levels as well, such as where a vehicle might reach a destination, collision, or other endpoint along a given path. As mentioned, a highest value leaf can be determined, and the corresponding sequence of actions for that path is provided as the five to ten second plan, which can be provided to an optimizer or controller in some embodiments to determine the actions to be taken over the next short time interval, such as the next 50 ms. The optimizer can take the path data, smooth out the actions, and produce a trajectory for the vehicle with a much finer granularity. In some embodiments the time interval output by the five-to-ten second planner may be variable, and may be based at least in part upon the type of action to be taken or various environmental factors.

In some embodiments deep learning can be used to make the tree more efficient as discussed in more detail elsewhere herein. In one embodiment, a policy function (part of a policy network) can be used to predict the best, or most probable, options at each level so not all options need to be explored further. This can make the tree narrower, with fewer paths to consider. In another embodiment, deep learning can be used to predict the value function for a path without having to extend the tree all the way to the various leaf nodes. This can make the tree shallower, without having to consider all the data for each path. In some embodiments, an optimization can be performed that avoids duplication of nodes, paths, or branches. For example, a sequence of moving to the right and accelerating three times may have the same result as accelerating three times then moving to the right. Thus, those paths may be able to be collapsed into a single path for consideration.

Also, as mentioned elsewhere herein, it is possible that at least some objects may be able to communicate data related to path planning. This may include, for example, a vehicle providing data about anticipated actions over at least one time period, or for multiple time periods. For example, a vehicle might communicate that it intends to make a right turn in one mile, intends to move to the right lane in the next half mile, and will be starting its move to the right in the next 50 ms. If this information is available, this information can be used to improve the accuracy of the vehicle action prediction (as the vehicle may not always exactly follow its intent), which can improve the accuracy of the path planning for the present object. Any such data can be provided to an action prediction and/or path planning model as discussed herein.

Further details on an example implementation are provided in the following example. Referring back to FIG. 1A, the present vehicle 102 being navigated is in the center lane, and there are other vehicles proximate the present vehicle on the road. The present vehicle 102 wants to change to the right lane, as may be commanded by a higher level of the planning system, in order to exit the road in a half mile. In order to determine the appropriate actions or movements to take, the present vehicle can conduct a search to some planning horizon. In this example, the process searches ahead five seconds in the future, with 0.25 s steps for the first two seconds and 0.5 s steps for the next three, for a total of ten steps. A decision tree can be generated where even levels correspond to potential motions of the present car, and odd levels correspond to responsive motions of other nearby actors.

As mentioned, the path planning benefits from prediction with respect to movement of the other vehicles. The reactions of these other vehicles can be predicted at each time step in order to compute an "optimal" path based on the currently available sensor data. A sequence of "moves" can be determined that will enable completion of the lane change. In this example it can be determined that the vehicle should decelerate, move to the right, and signal the intended move to the right. A prediction can indicate that the car behind and to the right is likely to slow, but stay to the right. After a successful lane change, the grid can be re-centered on the present vehicle 102. Such an approach only includes about four steps, since each step involves two frames for the present car and the corresponding response by the other vehicle(s). The other cars may not be this cooperative. The car in the right lane may not let the vehicle change lanes at the intended position. The car behind may not slow down. The present vehicle 102 needs to respond to these possibilities in subsequent planning cycles.

During each tree search, a planner can generate a number of possible moves for the present car for each even level of the tree. In the example, from the initial position the present vehicle car could do nothing (hold speed), it could turn to the left, it could turn to the right while holding speed, or turn to the right while decelerating. A "move generator" deep neural network (DNN) can be used in some embodiments to generate the three or four "highest value" moves to be explored, as may be based upon training from many instances of vehicle motion data. Similarly each other vehicle or actor can respond in multiple ways. The "move generator" DNN can generate the most likely move for non-critical actors, and up to three or four most probable moves for critical actors (such as the actors directly adjacent the present vehicle). At each step of the tree a second DNN can be used to assign a value to the position. A large negative value can be associated with any contact, with a smaller negative value being associated with getting too close or failing to maintain at least a specified distance or separation from another actor or object. A positive value can be associated with achieving the respective goal, such as by successfully moving into the right lane.

As mentioned, different drivers may respond differently. Approaches in accordance with various embodiments can therefore attempt to characterize the other nearby vehicles by observing the behavior of the vehicle, as may correspond to the behavior of the driver (or potentially of the navigation system, assuming some may be programmed or caused to behave differently). Some actors may be characterized as "aggressive," such as may be unlikely to be cooperative in any desired movement, others might be characterized differently, such as "cautious," "cooperative," "drunk," "timid," or "erratic." There is a continuum of driving styles, which can be exemplified by a set of scalars or value parameters, although in some embodiments classifying the actors into a discrete number of types or classifications allows for the use of a small number of "move generators", one for each classification, to suggest how each other vehicle will respond to a move by the present vehicle. In at least some embodiments, scalar values may be more general and easier to fit. As mentioned, in some embodiments these move generators can correspond to trained machine learning models that are able to infer actions based on the determined classification, along with current sensor data, etc. With enough observations of another vehicle, the move generator may be able to be "fine-tuned" for that vehicle, such as by interpolating between the move generators of standard types. The present vehicle can chose its move by backing up the values computed at the leaf nodes to the nodes directly below the root node. The highest value can be selected at the nodes for the present vehicle, with a weighted average of the most likely moves being selected for the nodes of the other vehicles in some embodiments.

At each even level of the decision tree a move generator network can be used to propose the best moves for the present object (e.g., vehicle). The network can accept as input the current occupancy grid, along with respective velocities and a goal. Velocities can be encoded in some embodiments by having multiple copies of the grid, one for objects at the vehicle speed, one for objects going a certain amount (e.g., a least 5 mph) faster, one for objects going a certain amount (e.g., at least 5 mph) slower, and so on. The goal can be specified by the higher levels of the planning hierarchy. In the present example, the goal is to change lanes to the right within some target distance. Other goals might be to change lanes to the left, to exit (left or right), to maximize velocity (in any lane), or to turn at an intersection (left or right), among other such options.

In some embodiments, the output of the move generator network is a set of possible moves. Thresholding the softmax layer of the network can be used to select the best M moves for an arbitrary M. A move can be defined as a direction and velocity pair, or a direction and acceleration pair, among other such options. For example (right, brake) might indicate to move to the right and decelerate. There may also be degrees of intensity for each, such as "right++" for a strong right turn, "brake--" for a very light application, etc. The move generator network is trained by reinforcement learning in some embodiments to learn the moves that are most likely to give the largest "rewards" in a given state and with a given goal. A straight reinforcement learning-based solution to the path planning problem can use the move generator directly to select the move. In some embodiments the move generator can be augmented with a policy network-based tree search, as discussed herein, to generate better moves than using the reinforcement learning scheme directly. The tree search can function as a multi-modal probability determination that can determine the risk and uncertainty for potential responsive actions. Such approaches can be are beneficial for environments with coupled degrees of freedom, as may correspond to the reactive movements or actions of actors in the environment. Similar move generator networks can be used for the other vehicles or actors. To limit the search, only critical vehicles or actors are considered in some embodiments, although in other embodiments actors or objects including those that may not be visible may be considered in order to improve accuracy of the determinations. As mentioned, a single most probable move can be determined for non-critical vehicles, with a small number (say two or three) of probable moves being determined for "critical" vehicles. Multiple move generator networks can be trained (or have a "personality" input to one network) to model different types of drivers (normal, aggressive, cautious, inattentive, etc.). The other vehicles can be classified based on observations to decide which network (or personality) to use to model them.

As mentioned, the present vehicle path determination system or manager can select the move or action that maximizes an expected value function. Various value functions can be utilized, and changing the value function can change the behavior of the vehicle. An example value function can include various terms, as may include the goal, with a small positive value for achieving the goal (such as to get in the right lane within 300 meters). A progress term can result in a very small positive value for advancing towards the destination. A collision term can be utilized, wherein a very large negative value reduction can be applied for contacting an object. The value can be increased by an amount proportional to the square of the contact velocity (approximates damage) and can be scaled by the type of object, such that contacting a human results in a very large value reduction, while the penalty for hitting a guard rail may be significantly lower. A closeness term can result in a negative value being applied for coming too close to another object, with the magnitude of the value corresponding to the closeness to the other object. A smoothness term can result in a small negative value being applied for extreme control movements, such as for a rapid acceleration or slamming of the brakes. A legality term can result in varying negative values being applied for breaking laws, with the magnitude depending on the law. For example, running a red light would likely come with a much more significant penalty than exceeding the speed limit by 1 mph. The penalties could be chosen such that a vehicle is enabled to break a law (or at least certain laws) when needed to avoid a collision. The law able to be broken may also depend upon the type of collision or object of the collision in some embodiments.

The value of a state can be the value calculated for that state plus the discounted value of future states. The value of a state (and hence of the move to that state) can be calculated in some embodiments by traversing the tree to a chosen depth, such as to level ten. At the leaves of the tree, the future contribution to the value function can be estimated using a "value network" that takes the current state and the goal as input and returns a value. The leaf value adds this future estimate to the calculated value of the leaf state to give the value of the leaf node. At internal nodes where other vehicles move, the future value can be computed by summing the values of child states weighted by the probability of these states. In this way, many possible futures are considered depending on the movement of the other vehicles. This is in contrast to an adversarial game where the minimum value would be taken.

Alternatively, the value of the child state that maximizes value for the other vehicle could be selected, the value function for that vehicle is known. However, taking a weighted probability enables the avoidance of states where it is possible (even if unlikely) that another vehicle will take an action that could result in a large negative reward (e.g., a collision). At internal nodes where the present vehicle moves, the future value can be computed by taking the maximum value over the moves that are evaluated. The path determination system in at least some embodiments will always select the move with the highest value according to the selected value function. The value function can be manually programed, indicating a statement of what the vehicle is trying to accomplish. The value network (for each personality) can be trained via reinforcement learning. As mentioned, different "personalities" of value and move networks can be trained by varying the terms of the value function. A very aggressive driver would have a high value for "progress" and "goal" and reduced values for the other terms. A cautious driver would be the opposite.

An example vehicle can utilize a hierarchy of planners. At the top level, a route planner can select a route, corresponding to a sequence of road segments joined by intersections, to reach a target destination. The time horizon for this level is minutes to hours, with each segment taking at least tens of seconds in this example. The next level of planning would involve lane selection and turns, causing the vehicle to be in the proper lane for each turn along the route and then executing the turn. This could have a similar time horizon. A short-range (i.e., for a 5 s-10 s time scale) planner described above fits below lane selection and turning. It determines with a granularity of, for example, 0.25 s how the ego-vehicle executes the higher-level goal. A fast-reaction path optimizer (or other controller) operates at a level below the short-range planner. It can operate every 50 ms with a 1 s time horizon, and act both to respond quickly to emergency situations (e.g., apply the brakes when a child runs in front of the vehicle), and to optimize the path selected by the short-range planner, plotting a smooth path that avoids obstacles and determining exact control values.

Various scenarios can be used to train the move and value networks, as well as to evaluate the effectiveness of those networks. This can include both directed testing and random testing. Directed testing involves pre-determined scenarios designed to challenge the system. One such scenario involves an uncooperative lane change, where the vehicle attempts to lanes left or right with dense, "uncooperative" other vehicles in target lane. Another example scenario involves a merge into dense traffic, with the length of the merging lane and the aggressiveness of the other vehicles being variable. Other potential scenarios involve merging into dense traffic on a roundabout, making a right turn into a lane of moving traffic, or accounting for a sudden obstacle, such as where a car, bicycle, pedestrian, or animal suddenly enters the road ahead of a vehicle from the left or right. The distance (or time) to the point of entry can be varied, as well as the presence and distance (or time) of an oncoming vehicle in a two-lane case. Another test scenario can involve a revealed obstacle, such as where a truck in front of the present vehicle swerves out of the lane to reveal a stopped car ahead, where the amount of open space for escape can be varied. Another scenario involves making a left turn with oncoming traffic, where the statistics of spacing between oncoming cars and their velocities can be varied.

In some embodiments, the move and value networks can be trained through a process such as self-play. Self-play can simulate an N-player rather than a 2-player game. A number of simulated vehicles are placed on a simulated road "grid." The weights of the value function can be varied for each vehicle to give a mix of personalities. Each vehicle can operate as if it were the present vehicle being controlled, performing its own tree search each time step and modeling the other vehicles without knowledge of their actual value functions. A simple "course" could be used for self-play involving a merge, a roundabout, making a left turn with oncoming traffic, etc.

Figure 4:
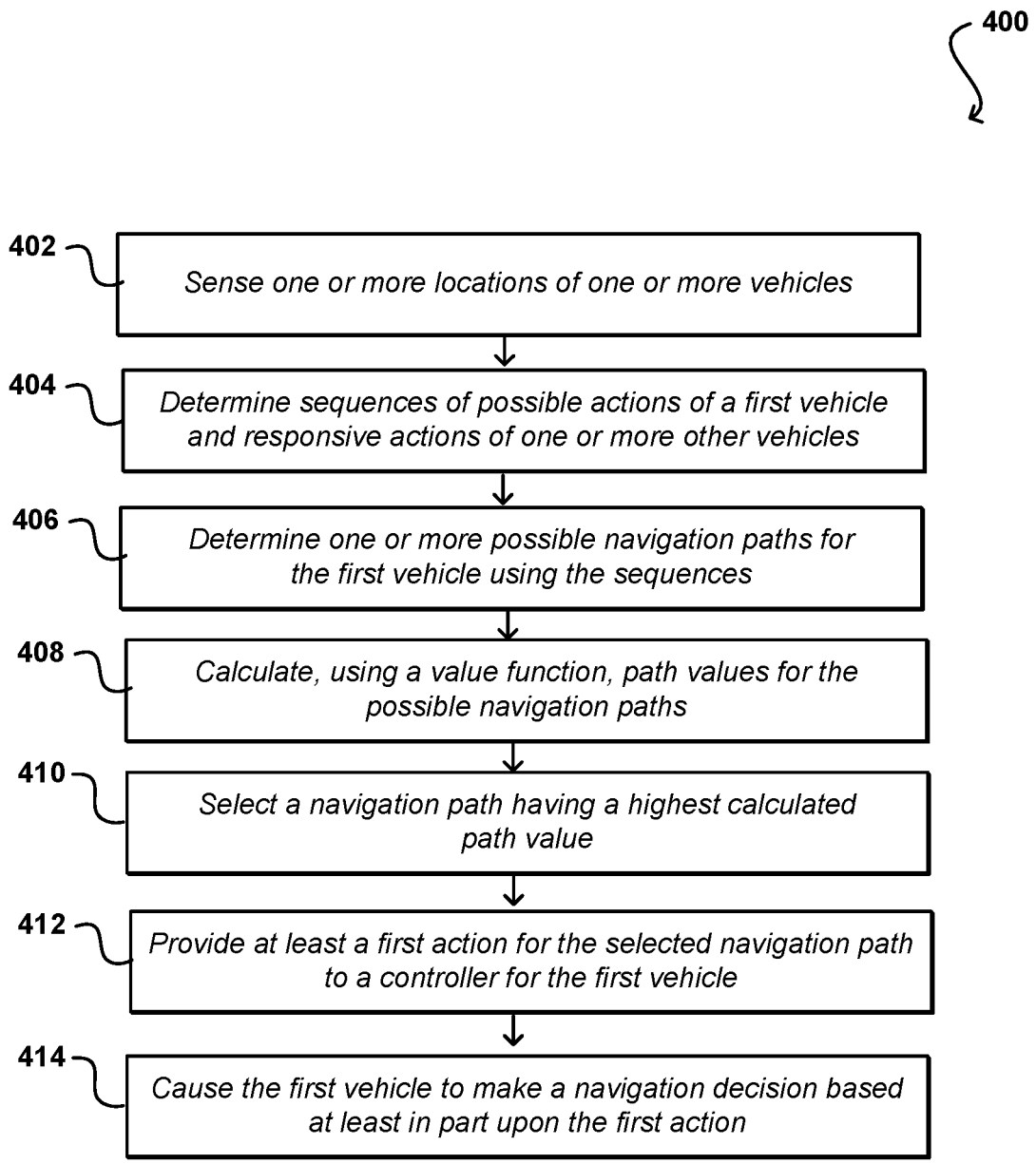
FIG. 4 illustrates a first example process for determining a navigation action for an object that can be utilized in accordance with various embodiments.

FIG. 4 illustrates an example process 400 for determining a navigation action for a vehicle that can be utilized in accordance with various embodiments. It should be understood for this and other processes discussed herein that there can be additional, alternative, or fewer steps performed in similar or alternative orders, or in parallel, within the scope of the various embodiments unless otherwise stated. In this example, the locations of one or more vehicles can be sensed 402 in an environment. This can include, for example, determining the relative positions of one or more other vehicles with respect to a first vehicle to be navigated. Other information can be determined as well, such as the velocities and directions of movement of the other vehicles, presence of road signals or traffic lights, brake lights, turn signals, presence of pedestrians, presence of construction zones, road status, or weather conditions, as may be determined using one or more vehicle sensors as discussed herein or obtained from other appropriate sources. Based at least in part upon the determined vehicle characteristics, one or more sequences of possible actions can be determined 404, where those sequences include alternating levels of possible actions of the first vehicle and probable responsive actions of the other vehicles. As mentioned, in some embodiments only the most probable responsive actions may be considered in some embodiments. One or more possible navigation paths for the first vehicle can be determined 406 using the sequences, such as may include sequences of actions with minimum probabilities. A value function can be used to calculate 408 path values for at least some of these possible navigation paths. As mentioned, the value function can include terms such as collision, closeness, progress, and the like, which can be used to determine the respective path weights. One of the navigation paths can then be selected 410, where that navigation path has the highest calculated path value. At least a first action can be provided 412 from the selected navigation path to a controller for the first vehicle. The action might be one of a discrete set of possible actions that can be provided to an optimizer of the controller to determine actions to be taken to maneuver the first vehicle. The first vehicle can then be caused 414 to maneuver, or otherwise make a navigation decision, based at least in part upon the first action.

Figure 5:
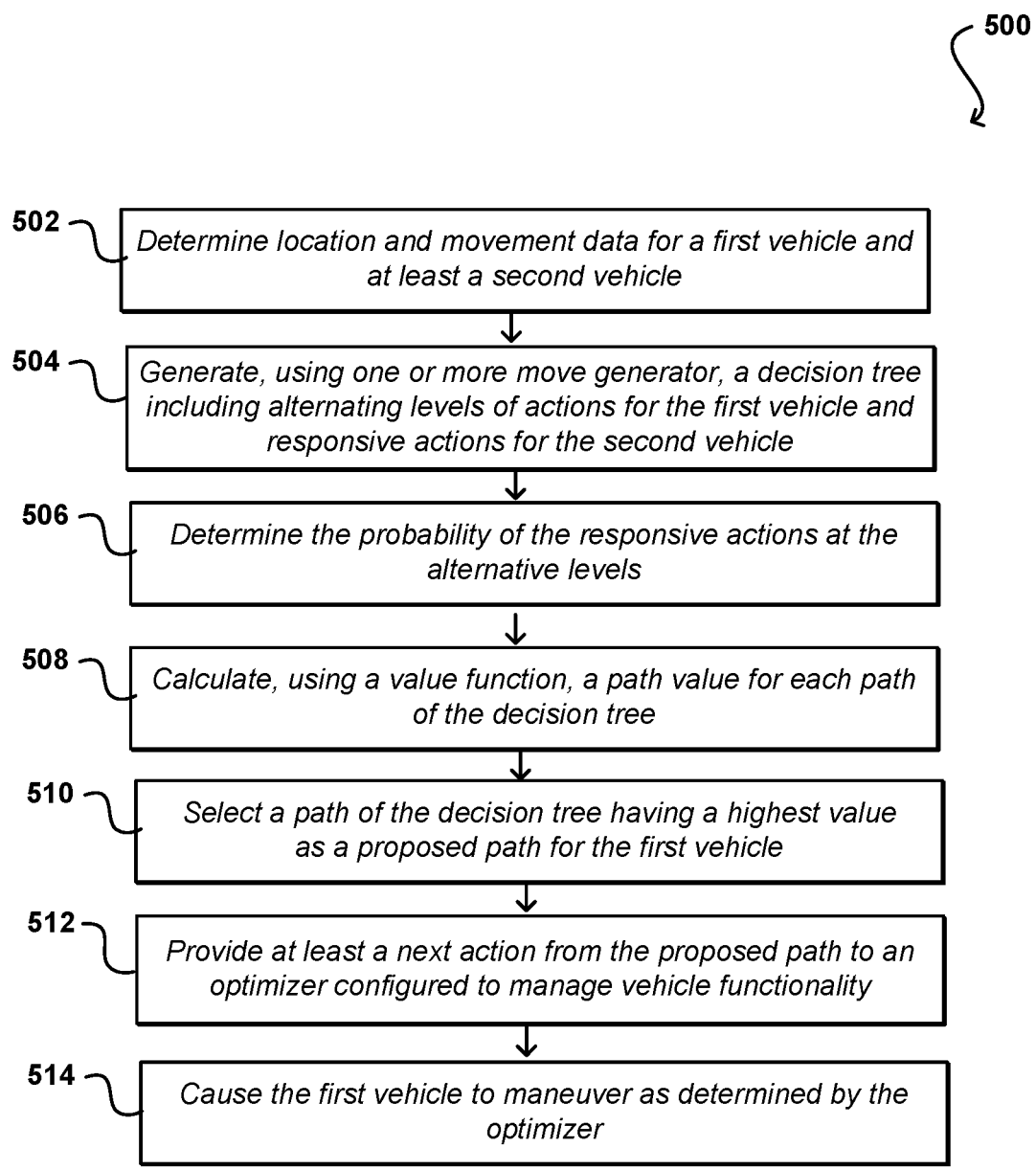
FIG. 5 illustrates a second example process for determining a navigation action for an object that can be utilized in accordance with various embodiments.

FIG. 5 illustrates another example process 500 for determining a navigation action for a vehicle that can be utilized in accordance with various embodiments. In this example, location and movement data are determined 502 for a first vehicle and at least a second vehicle. One or more move generators, such as may include neural networks, can be used to generate 504 a decision tree, where the decision tree includes alternative levels of actions for the first vehicle and responsive actions for at least the second vehicle. The probability of the responsive actions can be determined 506 at the various levels, where only actions with at least a minimum probability may be considered. In various embodiments this is performed using a policy network that uses the characterizations of the various other objects to suggest, using one or more relevant policies that accept the characterization classifications, parameters, or scalars to determine the probable responsive actions for those vehicles. In various embodiments this can approximate a Monte Carlo-based approach to determining probabilities of various actions. A selected value function can be used to calculate 508 a path value for each path of the decision tree. A path of the decision tree can be selected 510 that has a highest path value according to the selected value function. This path is based not only on the goal for the first vehicle, but also the probable responsive actions of at least the second vehicle. At least a next action from the proposed path can be provided 512 to an optimizer configured to manage vehicle functionality. The first vehicle can then be caused 514 to maneuver as determined by the optimizer.

Figure 6:
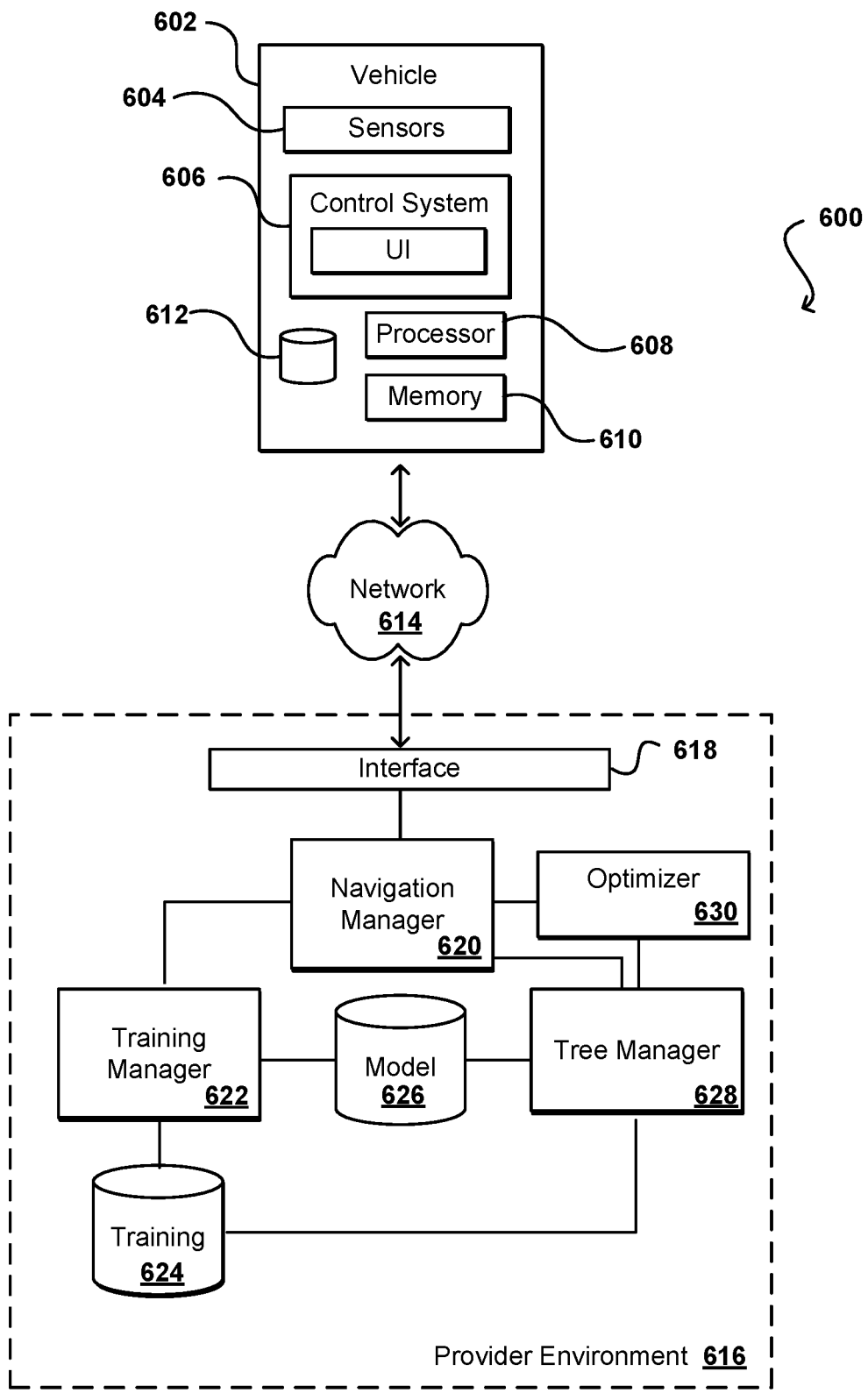
FIG. 6 illustrates an example environment in which aspects of the various embodiments can be implemented.

FIG. 6 illustrates an example environment 600 that can be utilized to implement aspects of the various embodiments. In many embodiments the various components will all be contained in the vehicle 602 itself, in order to avoid network or connectivity issues for security-sensitive operation. In other embodiments at least some of the components may be in a separate system, but may communicate directly over a wired or wireless communication rather than passing communications through a network. In some embodiments, vehicle 602 may be an autonomous vehicle or other type of vehicle or object that can be controlled at least partially autonomously. The vehicle can be any appropriate object capable of at least some type of motion or control, as may include an autonomous vehicle, robot, unmanned aerial vehicle, and the like. In some embodiments at least some of the navigation instructions can be determined using a separate user device, such as may include a desktop computer, notebook computer, smart phone, tablet computer, computer workstation, gaming console, and the like. The vehicle may include one or more sensors 604 capable of sensing data about the environment as well as other vehicles, actors, or objects within a vicinity of the vehicle. These sensors can include, for example, cameras, infrared sensors, motion detectors, accelerometers, electronic compasses, LIDAR devices, radar, computer vision modules, odometery sensors, and the like. As mentioned, data can be obtained from other sources as well, such as nearby vehicles able and/or permitted to share the data. The data can be fed to a control system 606 which can function to control the vehicle, such as to change direction, accelerate or decelerate, activate a turn signal, honk a horn, or perform another such action. The control system in at least some embodiments can include a user interface that enables a user, such as a human passenger, to modify one or more aspects of the operation of the vehicle. The vehicle typically will include one or more computer processors 608 and memory 610 including instructions executable by the processor(s) for purposes of making decisions about the vehicle and/or enacting those decisions to control the vehicle. Data captured by the sensors or captured about operation of the vehicle 602 may be stored to a local database 612 in at least some embodiments.

As mentioned, in some embodiments all determinations can be made on a controllable object, such as an autonomous vehicle. In some embodiments the training of the models can be performed remotely, and the trained models provided to the object for use. In some embodiments the long term planning may be performed remotely, with short time scale decisions being made on the vehicle. In still other embodiments all path planning decisions may be made remotely using data collected by the object, as well as from other objects or sources, and those decisions fed to the control system on the object. Various other options for splitting the functionality between the object and one or more other computing devices or systems can be utilized as well within the scope of the various embodiments.

In some embodiments, sensor data captured by the sensors 604 of the vehicle 602 can be processed on a client device in order to determine navigation actions as discussed herein. In other embodiments, the sensor data might be sent over at least one network 614 to be received by a remote computing system, as may be part of a resource provider environment 616. The software architecture in the environment 616 can also be executed in the vehicle or on a separate computing device, among other such options. The at least one network 614 can include any appropriate network, including an intranet, the Internet, a cellular network, a local area network (LAN), or any other such network or combination, and communication over the network can be enabled via wired and/or wireless connections. The provider environment 616 can include any appropriate components for receiving requests and returning information or performing actions in response to those requests. As an example, the provider environment might include Web servers and/or application servers for receiving and processing requests, then returning data or other content or information in response to the request.

Communications received to the provider environment 616 can be received to an interface layer 618. The interface layer 618 can include application programming interfaces (APIs) or other exposed interfaces enabling a user to submit requests to the provider environment. The interface layer 618 in this example can include other components as well, such as at least one Web server, routing components, load balancers, and the like. Components of the interface layer 618 can determine a type of request or communication, and can direct the request to the appropriate system or service. For example, if a communication is to train a move neural network for a specific type of vehicle, the communication can be directed to a navigation manager 620, which can be a system or service provided using various resources of the provider environment 616. The request can then be directed to a training manager 622, which can select an appropriate model or network and then train the model using relevant training data 624. Once a network is trained and successfully evaluated, the network can be stored to a model repository 626, for example, that may store different models or networks for different types of vehicle, for example. If a request is received that includes sensor data for the vehicle 602, information for the request can be directed to a tree management component 628 that can obtain the corresponding trained network. The tree management component 628 can then generate a decision tree using sequences of possible actions and probable reactions, and generate scores for each sequence using a selected value function. As discussed elsewhere herein, the tree search (including inference for move generation and value determination) is a distinct process from training. The tree search and inference in many instances will run on the vehicle, and not on a separate system or in the cloud. A path can be selected using the highest path score, and a next option provided to an optimizer 630, which can also be located on the vehicle in at least some embodiments. The optimizer 630, which can also be internal to the control system 606, can provide navigation actions that can be used to control the vehicle and cause the vehicle to proceed along the selected path.

In various embodiments the processor 608 (or a processor of the training manager 622 or tree search module 628) will be a central processing unit (CPU). As mentioned, however, resources in such environments can utilize GPUs to process data for at least certain types of requests. With thousands of cores, GPUs are designed to handle substantial parallel workloads and, therefore, have become popular in deep learning for training neural networks and generating predictions. While the use of GPUs for offline builds has enabled faster training of larger and more complex models, generating predictions offline implies that either request-time input features cannot be used or predictions must be generated for all permutations of features and stored in a lookup table to serve real-time requests. If the deep learning framework supports a CPU-mode and the model is small and simple enough to perform a feed-forward on the CPU with a reasonable latency, then a service on a CPU instance could host the model. In this case, training can be done offline on the GPU and inference done in real-time on the CPU. If the CPU approach is not a viable option, then the service can run on a GPU instance. Because GPUs have different performance and cost characteristics than CPUs, however, running a service that offloads the runtime algorithm to the GPU can require it to be designed differently from a CPU based service.

As mentioned, various embodiments take advantage of machine learning. As an example, deep neural networks (DNNs) developed on processors have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

In various embodiments, central models can be trained and propagated out to various vehicles or objects for use in path planning and prediction. As mentioned, in embodiments that utilize continued learning, data from the vehicles can be provided back to an edge server, or a central server, for example, to further train the central model(s)m, which can then be propagated out to the various vehicles for future determinations.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected perceptrons (e.g., nodes) that can be trained with enormous amounts of input data to quickly solve complex problems with high accuracy. In one example, a first layer of the DLL model breaks down an input image of an automobile into various sections and looks for basic patterns such as lines and angles. The second layer assembles the lines to look for higher level patterns such as wheels, windshields, and mirrors. The next layer identifies the type of vehide, and the final few layers generate a label for the input image, identifying the model of a specific automobile brand. Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty Million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, a computing platform can deliver performance required for deep neural network-based artificial intelligence and machine learning applications.

Figure 7:
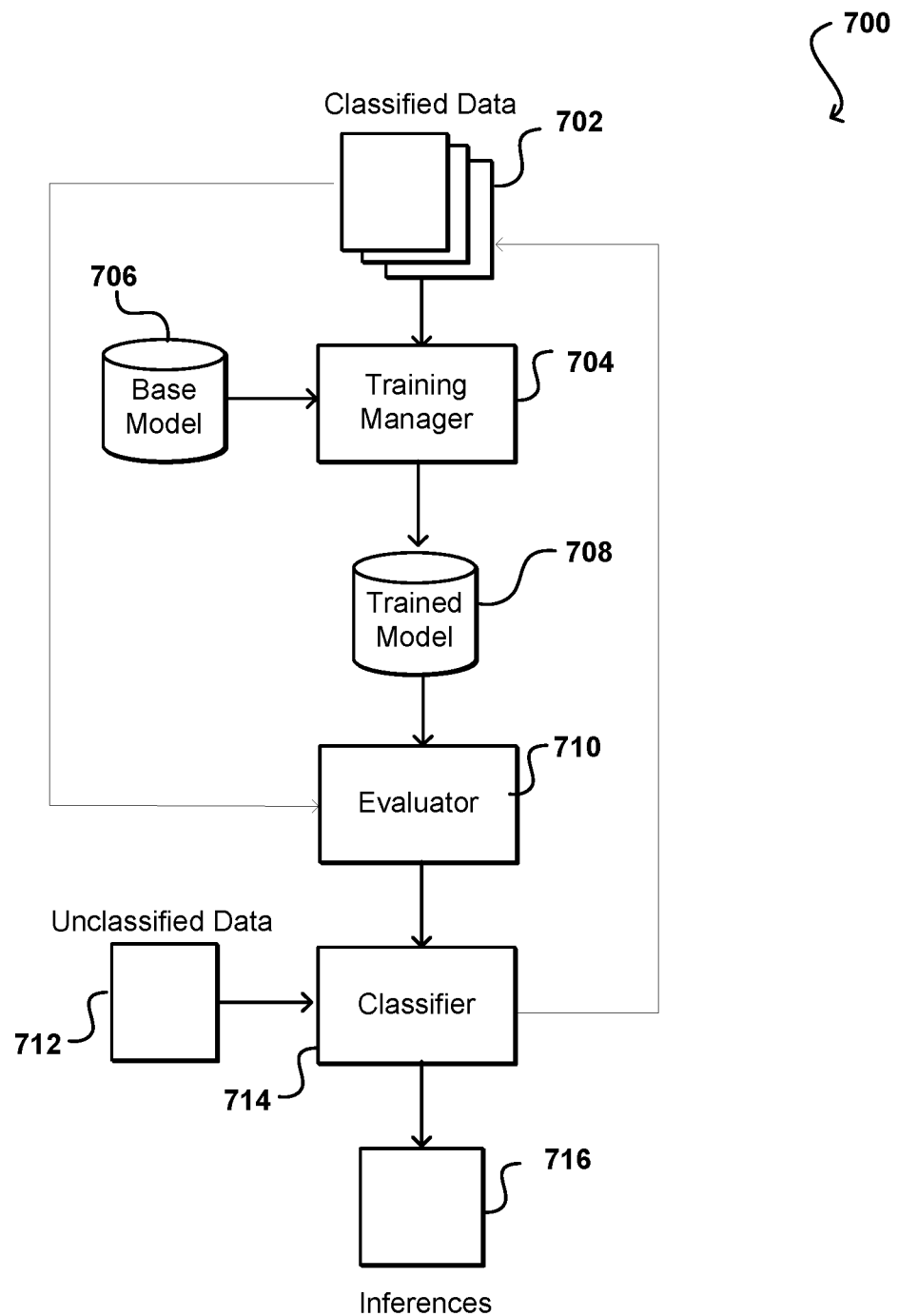
FIG. 7 illustrates an example system for training an image synthesis network that can be utilized in accordance with various embodiments.

FIG. 7 illustrates an example system 700 that can be used to classify data, or generate inferences, in accordance with various embodiments. Various predictions, labels, or other outputs can be generated for input data as well, as should be apparent in light of the teachings and suggestions contained herein. Further, both supervised and unsupervised training can be used in various embodiments discussed herein. In this example, a set of classified data 702 is provided as input to function as training data. The classified data can include instances of at least one type of object for which a statistical model is to be trained, as well as information that identifies that type of object. For example, the classified data might include a set of images that each includes a representation of a type of object, where each image also includes, or is associated with, a label, metadata, classification, or other piece of information identifying the type of object represented in the respective image. Various other types of data may be used as training data as well, as may include text data, audio data, video data, and the like. The classified data 702 in this example is provided as training input to a training manager 704. The training manager 704 can be a system or service that includes hardware and software, such as one or more computing devices executing a training application, for training the statistical model. In this example, the training manager 704 will receive an instruction or request indicating a type of model to be used for the training. The model can be any appropriate statistical model, network, or algorithm useful for such purposes, as may include an artificial neural network, deep learning algorithm, learning classifier, Bayesian network, and the like. The training manager 704 can select a base model, or other untrained model, from an appropriate repository 706 and utilize the classified data 702 to train the model, generating a trained model 708 that can be used to classify similar types of data. In some embodiments where classified data is not used, the appropriate based model can still be selected for training on the input data per the training manager.

The model can be trained in a number of different ways, as may depend in part upon the type of model selected. For example, in one embodiment a machine learning algorithm can be provided with a set of training data, where the model is a model artifact created by the training process. Each instance of training data contains the correct answer (e.g., classification), which can be referred to as a target or target attribute. The learning algorithm finds patterns in the training data that map the input data attributes to the target, the answer to be predicted, and a machine learning model is output that captures these patterns. The machine learning model can then be used to obtain predictions on new data for which the target is not specified.

In one example, a training manager can select from a set of machine learning models including binary classification, multiclass classification, and regression models. The type of model to be used can depend at least in part upon the type of target to be predicted. Machine learning models for binary classification problems predict a binary outcome, such as one of two possible classes. A learning algorithm such as logistic regression can be used to train binary classification models. Machine learning models for multiclass classification problems allow predictions to be generated for multiple classes, such as to predict one of more than two outcomes. Multinomial logistic regression can be useful for training multiclass models. Machine learning models for regression problems predict a numeric value. Linear regression can be useful for training regression models.

In order to train a machine learning model in accordance with one embodiment, the training manager must determine the input training data source, as well as other information such as the name of the data attribute that contains the target to be predicted, required data transformation instructions, and training parameters to control the learning algorithm. During the training process, a training manager in some embodiments may automatically select the appropriate learning algorithm based on the type of target specified in the training data source. Machine learning algorithms can accept parameters used to control certain properties of the training process and of the resulting machine learning model. These are referred to herein as training parameters. If no training parameters are specified, the training manager can utilize default values that are known to work well for a large range of machine learning tasks. Examples of training parameters for which values can be specified include the maximum model size, maximum number of passes over training data, shuffle type, regularization type, learning rate, and regularization amount. Default settings may be specified, with options to adjust the values to fine-tune performance.

The maximum model size is the total size, in units of bytes, of patterns that are created during the training of model. A model may be created of a specified size by default, such as a model of 100 MB. If the training manager is unable to determine enough patterns to fill the model size, a smaller model may be created. If the training manager finds more patterns than will fit into the specified size, a maximum cut-off may be enforced by trimming the patterns that least affect the quality of the learned model. Choosing the model size provides for control of the trade-off between the predictive quality of a model and the cost of use. Smaller models can cause the training manager to remove many patterns to fit within the maximum size limit, affecting the quality of predictions. Larger models, on the other hand, may cost more to query for real-time predictions. Larger input data sets do not necessarily result in larger models because models store patterns, not input data; if the patterns are few and simple, the resulting model will be small. Input data that has a large number of raw attributes (input columns) or derived features (outputs of the data transformations) will likely have more patterns found and stored during the training process.

In some embodiments, the training manager can make multiple passes or iterations over the training data to discover patterns. There may be a default number of passes, such as ten passes, while in some embodiments up to a maximum number of passes may be set, such as up to one hundred passes. In some embodiments there may be no maximum set, or there may be a convergence or other criterion set which will trigger an end to the training process. In some embodiments the training manager can monitor the quality of patterns (i.e., the model convergence) during training, and can automatically stop the training when there are no more data points or patterns to discover. Data sets with only a few observations may require more passes over the data to obtain higher model quality. Larger data sets may contain many similar data points, which can reduce the need for a large number of passes. The potential impact of choosing more data passes over the data is that the model training can takes longer and cost more in terms of resources and system utilization.

In some embodiments the training data is shuffled before training, or between passes of the training. The shuffling in many embodiments is a random or pseudo-random shuffling to generate a truly random ordering, although there may be some constraints in place to ensure that there is no grouping of certain types of data, or the shuffled data may be reshuffled if such grouping exists, etc. Shuffling changes the order or arrangement in which the data is utilized for training so that the training algorithm does not encounter groupings of similar types of data, or a single type of data for too many observations in succession. For example, a model might be trained to predict a product type, where the training data includes movie, toy, and video game product types. The data might be sorted by product type before uploading. The algorithm can then process the data alphabetically by product type, seeing only data for a type such as movies first. The model will begin to learn patterns for movies. The model will then encounter only data for a different product type, such as toys, and will try to adjust the model to fit the toy product type, which can degrade the patterns that fit movies. This sudden switch from movie to toy type can produce a model that does not learn how to predict product types accurately. Shuffling can be performed in some embodiments before the training data set is split into training and evaluation subsets, such that a relatively even distribution of data types is utilized for both stages. In some embodiments the training manager can automatically shuffle the data using, for example, a pseudo-random shuffling technique.

When creating a machine learning model, the training manager in some embodiments can enable a user to specify settings or apply custom options. For example, a user may specify one or more evaluation settings, indicating a portion of the input data to be reserved for evaluating the predictive quality of the machine learning model. The user may specify a recipe that indicates which attributes and attribute transformations are available for model training. The user may also specify various training parameters that control certain properties of the training process and of the resulting model.

Once the training manager has determined that training of the model is complete, such as by using at least one end criterion discussed herein, the trained model 708 can be provided for use by a classifier 714 in classifying unclassified data 712. In many embodiments, however, the trained model 708 will first be passed to an evaluator 710, which may include an application or process executing on at least one computing resource for evaluating the quality (or another such aspect) of the trained model. The model is evaluated to determine whether the model will provide at least a minimum acceptable or threshold level of performance in predicting the target on new and future data. Since future data instances will often have unknown target values, it can be desirable to check an accuracy metric of the machine learning on data for which the target answer is known, and use this assessment as a proxy for predictive accuracy on future data.

In some embodiments, a model is evaluated using a subset of the classified data 702 that was provided for training. The subset can be determined using a shuffle and split approach as discussed above. This evaluation data subset will be labeled with the target, and thus can act as a source of ground truth for evaluation. Evaluating the predictive accuracy of a machine learning model with the same data that was used for training is not useful, as positive evaluations might be generated for models that remember the training data instead of generalizing from it. Once training has completed, the evaluation data subset is processed using the trained model 708 and the evaluator 710 can determine the accuracy of the model by comparing the ground truth data against the corresponding output (or predictions/observations) of the model. The evaluator 710 in some embodiments can provide a summary or performance metric indicating how well the predicted and true values match. If the trained model does not satisfy at least a minimum performance criterion, or other such accuracy threshold, then the training manager 704 can be instructed to perform further training, or in some instances try training a new or different model, among other such options. If the trained model 708 satisfies the relevant criteria, then the trained model can be provided for use by the classifier 714.

When creating and training a machine learning model, it can be desirable in at least some embodiments to specify model settings or training parameters that will result in a model capable of making the most accurate predictions. Example parameters include the number of passes to be performed (forward and/or backward), regularization, model size, and shuffle type. As mentioned, however, selecting model parameter settings that produce the best predictive performance on the evaluation data might result in an overfitting of the model. Overfitting occurs when a model has memorized patterns that occur in the training and evaluation data sources, but has failed to generalize the patterns in the data. Overfitting often occurs when the training data includes all of the data used in the evaluation. A model that has been over fit may perform well during evaluation, but may fail to make accurate predictions on new or otherwise unclassified data. To avoid selecting an over fitted model as the best model, the training manager can reserve additional data to validate the performance of the model. For example, the training data set might be divided into 60 percent for training, and 40 percent for evaluation or validation, which may be divided into two or more stages. After selecting the model parameters that work well for the evaluation data, leading to convergence on a subset of the validation data, such as half the validation data, a second validation may be executed with a remainder of the validation data to ensure the performance of the model. If the model meets expectations on the validation data, then the model is not overfitting the data. Alternatively, a test set or held-out set may be used for testing the parameters. Using a second validation or testing step helps to select appropriate model parameters to prevent overfitting. However, holding out more data from the training process for validation makes less data available for training. This may be problematic with smaller data sets as there may not be sufficient data available for training. One approach in such a situation is to perform cross-validation as discussed elsewhere herein.

There are many metrics or insights that can be used to review and evaluate the predictive accuracy of a given model. One example evaluation outcome contains a prediction accuracy metric to report on the overall success of the model, as well as visualizations to help explore the accuracy of the model beyond the prediction accuracy metric. The outcome can also provide an ability to review the impact of setting a score threshold, such as for binary classification, and can generate alerts on criteria to check the validity of the evaluation. The choice of the metric and visualization can depend at least in part upon the type of model being evaluated.

Once trained and evaluated satisfactorily, the trained machine learning model can be used to build or support a machine learning application. In one embodiment building a machine learning application is an iterative process that involves a sequence of steps. The core machine learning problem(s) can be framed in terms of what is observed and what answer the model is to predict. Data can then be collected, cleaned, and prepared to make the data suitable for consumption by machine learning model training algorithms. The data can be visualized and analyzed to run sanity checks to validate the quality of the data and to understand the data. It might be the case that the raw data (e.g., input variables) and answer (e.g., the target) are not represented in a way that can be used to train a highly predictive model. Therefore, it may be desirable to construct more predictive input representations or features from the raw variables. The resulting features can be fed to the learning algorithm to build models and evaluate the quality of the models on data that was held out from model building. The model can then be used to generate predictions of the target answer for new data instances.

In the example system 700 of FIG. 7, the trained model 710 after evaluation is provided, or made available, to a classifier 714 that is able to use the trained model to process unclassified data. This may include, for example, data received from users or third parties that are not classified, such as query images that are looking for information about what is represented in those images. The unclassified data can be processed by the classifier using the trained model, and the results 716 (i.e., the classifications or predictions) that are produced can be sent back to the respective sources or otherwise processed or stored. In some embodiments, and where such usage is permitted, the now classified data instances can be stored to the classified data repository, which can be used for further training of the trained model 708 by the training manager. In some embodiments the model will be continually trained as new data is available, but in other embodiments the models will be retrained periodically, such as once a day or week, depending upon factors such as the size of the data set or complexity of the model.

The classifier can include appropriate hardware and software for processing the unclassified data using the trained model. In some instances the classifier will include one or more computer servers each having one or more graphics processing units (GPUs) that are able to process the data. The configuration and design of GPUs can make them more desirable to use in processing machine learning data than CPUs or other such components. The trained model in some embodiments can be loaded into GPU memory and a received data instance provided to the GPU for processing. GPUs can have a much larger number of cores than CPUs, and the GPU cores can also be much less complex. Accordingly, a given GPU may be able to process thousands of data instances concurrently via different hardware threads. A GPU can also be configured to maximize floating point throughput, which can provide significant additional processing advantages for a large data set.

Even when using GPUs, accelerators, and other such hardware to accelerate tasks such as the training of a model or classification of data using such a model, such tasks can still require significant time, resource allocation, and cost. For example, if the machine learning model is to be trained using 100 passes, and the data set includes 1,000,000 data instances to be used for training, then all million instances would need to be processed for each pass. Different portions of the architecture can also be supported by different types of devices. For example, training may be performed using a set of servers at a logically centralized location, as may be offered as a service, while classification of raw data may be performed by such a service or on a client device, among other such options. These devices may also be owned, operated, or controlled by the same entity or multiple entities in various embodiments.

Figure 8:
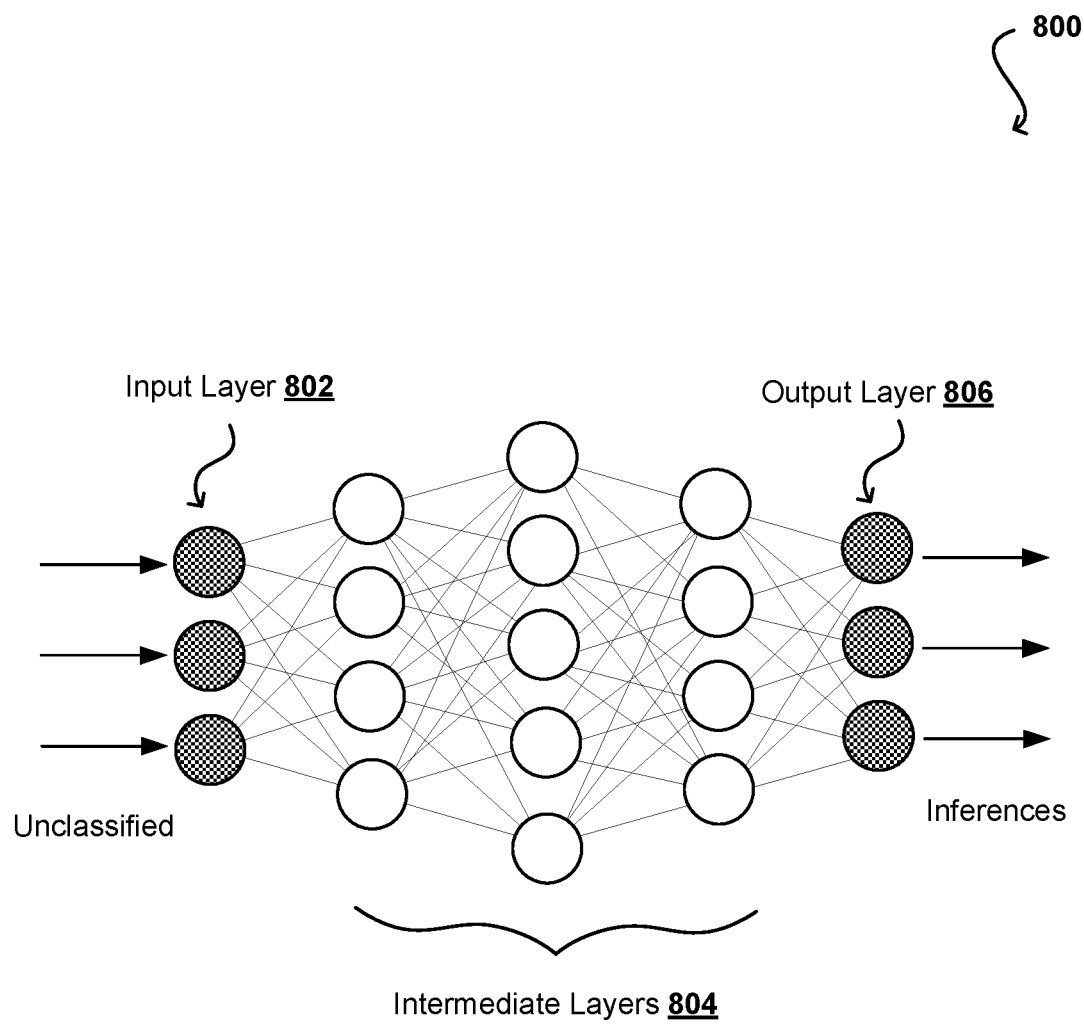
FIG. 8 illustrates layers of an example statistical model that can be utilized in accordance with various embodiments.

FIG. 8 illustrates an example statistical model 800 that can be utilized in accordance with various embodiments. In this example the statistical model is an artificial neural network (ANN) that includes a multiple layers of nodes, including an input layer 802, an output layer 806, and multiple layers 804 of intermediate nodes, often referred to as "hidden" layers, as the internal layers and nodes are typically not visible or accessible in conventional neural networks. As discussed elsewhere herein, there can be additional types of statistical models used as well, as well as other types of neural networks including other numbers of selections of nodes and layers, among other such options. In this network, all nodes of a given layer are interconnected to all nodes of an adjacent layer. As illustrated, the nodes of an intermediate layer will then each be connected to nodes of two adjacent layers. The nodes are also referred to as neurons or connected units in some models, and connections between nodes are referred to as edges. Each node can perform a function for the inputs received, such as by using a specified function. Nodes and edges can obtain different weightings during training, and individual layers of nodes can perform specific types of transformations on the received input, where those transformations can also be learned or adjusted during training. The learning can be supervised or unsupervised learning, as may depend at least in part upon the type of information contained in the training data set. Various types of neural networks can be utilized, as may include a convolutional neural network (CNN) that includes a number of convolutional layers and a set of pooling layers, and have proven to be beneficial for applications such as image recognition. CNNs can also be easier to train than other networks due to a relatively small number of parameters to be determined.

In some embodiments, such a complex machine learning model can be trained using various tuning parameters. Choosing the parameters, fitting the model, and evaluating the model are parts of the model tuning process, often referred to as hyperparameter optimization. Such tuning can involve introspecting the underlying model or data in at least some embodiments. In a training or production setting, a robust workflow can be important to avoid overfitting of the hyperparameters as discussed elsewhere herein. Cross-validation and adding Gaussian noise to the training dataset are techniques that can be useful for avoiding overfitting to any one dataset. For hyperparameter optimization it may be desirable in some embodiments to keep the training and validation sets fixed. In some embodiments, hyperparameters can be tuned in certain categories, as may include data preprocessing (in other words, translating words to vectors), CNN architecture definition (for example, filter sizes, number of filters), stochastic gradient descent parameters (for example, learning rate), and regularization (for example, dropout probability), among other such options.

In an example pre-processing step, instances of a dataset can be embedded into a lower dimensional space of a certain size. The size of this space is a parameter to be tuned. The architecture of the CNN contains many tunable parameters. A parameter for filter sizes can represent an interpretation of the information that corresponds to the size of an instance that will be analyzed. In computational linguistics, this is known as the n-gram size. An example CNN uses three different filter sizes, which represent potentially different n-gram sizes. The number of filters per filter size can correspond to the depth of the filter. Each filter attempts to learn something different from the structure of the instance, such as the sentence structure for textual data. In the convolutional layer, the activation function can be a rectified linear unit and the pooling type set as max pooling. The results can then be concatenated into a single dimensional vector, and the last layer is fully connected onto a two-dimensional output. This corresponds to the binary classification to which an optimization function can be applied.

One such function is an implementation of a Root Mean Square (RMS) propagation method of gradient descent, where example hyperparameters can include learning rate, batch size, maximum gradient normal, and epochs. With neural networks, regularization can be an extremely important consideration. As mentioned, in some embodiments the input data may be relatively sparse. A main hyperparameter in such a situation can be the dropout at the penultimate layer, which represents a proportion of the nodes that will not "fire" at each training cycle. An example training process can suggest different hyperparameter configurations based on feedback for the performance of previous configurations. The model can be trained with a proposed configuration, evaluated on a designated validation set, and the performance reporting. This process can be repeated to, for example, trade off exploration (learning more about different configurations) and exploitation (leveraging previous knowledge to achieve better results).

As training CNNs can be parallelized and GPU-enabled computing resources can be utilized, multiple optimization strategies can be attempted for different scenarios. A complex scenario allows tuning the model architecture and the preprocessing and stochastic gradient descent parameters. This expands the model configuration space. In a basic scenario, only the preprocessing and stochastic gradient descent parameters are tuned. There can be a greater number of configuration parameters in the complex scenario than in the basic scenario. The tuning in a joint space can be performed using a linear or exponential number of steps, iteration through the optimization loop for the models. The cost for such a tuning process can be significantly less than for tuning processes such as random search and grid search, without any significant performance loss.

Some embodiments can utilize backpropagation to calculate a gradient used for determining the weights for the neural network. Backpropagation is a form of differentiation, and can be used by a gradient descent optimization algorithm to adjust the weights applied to the various nodes or neurons as discussed above. The weights can be determined in some embodiments using the gradient of the relevant loss function. Backpropagation can utilize the derivative of the loss function with respect to the output generated by the statistical model. As mentioned, the various nodes can have associated activation functions that define the output of the respective nodes. Various activation functions can be used as appropriate, as may include radial basis functions (RBFs) and sigmoids, which can be utilized by various support vector machines (SVMs) for transformation of the data. The activation function of an intermediate layer of nodes is referred to herein as the inner product kernel. These functions can include, for example, identity functions, step functions, sigmoidal functions, ramp functions, and the like. Activation functions can also be linear or non-linear, among other such options.

Figure 9:
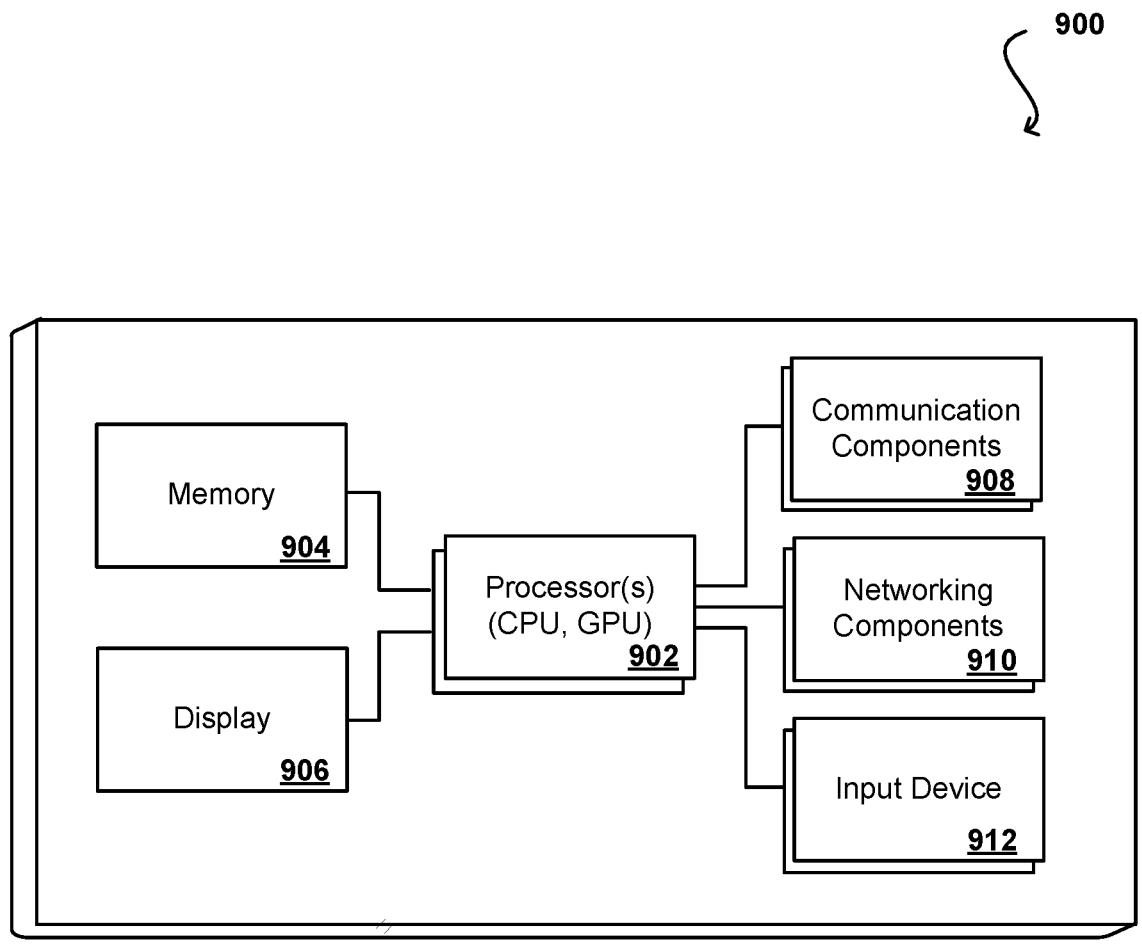
FIG. 9 illustrates example components of a computing device that can be used to implement aspects of the various embodiments.

FIG. 9 illustrates a set of basic components of a computing device 900 that can be utilized to implement aspects of the various embodiments. In this example, the device includes at least one processor 902 for executing instructions that can be stored in a memory device or element 904. As would be apparent to one of ordinary skill in the art, the device can include many types of memory, data storage or computer-readable media, such as a first data storage for program instructions for execution by the processor 902, the same or separate storage can be used for images or data, a removable memory can be available for sharing information with other devices, and any number of communication approaches can be available for sharing with other devices. The device typically will include some type of display element 906, such as a touch screen, organic light emitting diode (OLED) or liquid crystal display (LCD), although devices such as portable media players might convey information via other means, such as through audio speakers. As discussed, the device in many embodiments will include at least communication component 908 and/or networking components 910, such as may support wired or wireless communications over at least one network, such as the Internet, a local area network (LAN), Bluetooth®, or a cellular network, among other such options. The components can enable the device to communicate with remote systems or services. The device can also include at least one additional input device 912 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

The various embodiments can be implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP or FTP. The network can be, for example, a local area network, a wide-area network, a virtual private network, the Internet, an intranet, an extranet, a public switched telephone network, an infrared network, a wireless network and any combination thereof. In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Python, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. One or more processors, comprising:
   circuitry to:
   use one or more neural networks to generate a plurality of potential navigation paths of an autonomous vehicle and predict movements of one or more other vehicles as a result of the autonomous vehicle moving according to the plurality of potential navigation paths; and
   control the autonomous vehicle according to a selected one of the plurality of potential navigation paths based, at least in part, on the predicted movements of the one or more other vehicles.

2. The one or more processors of claim 1, wherein the one or more neural networks are further to generate a decision tree for the autonomous vehicle, the decision tree including alternating levels of possible actions for the autonomous vehicle and a probable reactive actions of at least one of the other vehicles.

3. The one or more processors of claim 2, wherein the one or more neural networks are further to use a policy network to determine probable reactive actions at levels of the decision
   tree for consideration for one or more possible navigation paths.

4. The one or more processors of claim 2, wherein the one or more neural networks are further to estimate values of nodes at one or more levels of the decision tree.

5. The one or more processors of claim 1 wherein the one or more neural networks are further to provide at least a first action of a selected navigation path to an optimizer of the autonomous vehicle; and
   causing the autonomous vehicle to maneuver based upon navigation instructions generated by the optimizer.

6. A system, comprising:
   at least one processor; and
   memory including instructions that, when executed by the at least one processor, cause the system to:
   use one or more neural networks to generate a plurality of potential navigation paths of an autonomous vehicle and predict movements of one or more other vehicles as a result of the autonomous vehicle moving according to the plurality of potential navigation paths; and
   control the autonomous vehicle according to a selected one of the plurality of potential navigation paths based, at least in part, on the predicted movements of the one or more other vehicles.

7. The system of claim 6, wherein the instructions when executed further cause the system to:
   sense, using one or more sensors of the autonomous vehicle, characteristics of the one or more other vehicles;
   determine, using the one or more neural networks, one or more possible navigation paths for the autonomous vehicle; and
   determine a selected navigation path from the one or more possible navigation paths based, at least in part, on a value function.

8. The system of claim 7, wherein the instructions when executed further cause the system to:
   cause the autonomous vehicle to maneuver according to at least a portion of the selected navigation path.

9. The system of claim 6, wherein the instructions when executed further cause the system to:
   use the one or more neural networks to generate a decision tree for the autonomous vehicle, the decision tree including alternating levels of possible actions for the autonomous vehicle and a probable reactive actions of the one or more other vehicles.

10. The system of claim 9, wherein the instructions when executed further cause the system to:
use the one or more neural networks to use a policy network to determine probable responsive actions at levels of the decision tree for consideration for one or more possible navigation paths.

11. The system of claim 9, wherein the instructions when executed further cause the system to use the one or more neural networks to:
receive intent data corresponding to at least one of the other vehicles; and
use the intent data to determine at least a subset of the probable reactive actions.

* * * * *